US008875369B2

(12) United States Patent
Heimmer

(10) Patent No.: US 8,875,369 B2

(45) Date of Patent: Nov. 4, 2014

(54) SELF-ALIGNING PLUG REMOVAL AND INSTALLATION SYSTEM AND METHOD

(76) Inventor: Darlene Heimmer, East Moriches, NY (US)

( * ) Notice: Subject to any disclaimer, the term of this patent is extended or adjusted under 35 U.S.C. 154(b) by 465 days.

(21) Appl. No.: 12/959,342

(22) Filed: Dec. 2, 2010

(65) Prior Publication Data

US 2011/0126394 A1 Jun. 2, 2011

Related U.S. Application Data

(60) Provisional application No. 61/283,285, filed on Dec. 2, 2009.

(51) Int. Cl.
*B23P 19/04* (2006.01)
*B25B 27/02* (2006.01)

(52) U.S. Cl.
CPC .................................... *B25B 27/023* (2013.01)
USPC ............... 29/426.5; 29/270; 29/261; 114/197

(58) Field of Classification Search
CPC ........ B25B 27/023; B60B 27/00; B63J 99/00; B63B 13/00
USPC ................... 29/402.1, 402.03, 402.04, 426.1, 29/255–278; 114/197, 227, 183 R
See application file for complete search history.

(56) References Cited

U.S. PATENT DOCUMENTS

| | | | | |
|---|---|---|---|---|
| 1,475,199 | A * | 11/1923 | Rust | 49/465 |
| 2,116,770 | A * | 5/1938 | Scillia | 137/326 |
| 3,812,810 | A * | 5/1974 | Moeller | 114/197 |
| 3,859,945 | A * | 1/1975 | Moeller | 114/197 |
| 4,092,770 | A * | 6/1978 | Polashak | 29/283 |
| 4,542,373 | A * | 9/1985 | Hillock | 340/984 |
| 4,672,731 | A * | 6/1987 | Taylor | 29/259 |
| 6,227,132 | B1 * | 5/2001 | Garcia | 114/197 |
| 6,609,283 | B1 * | 8/2003 | Somerville | 29/262 |
| 7,520,041 | B1 * | 4/2009 | Aguilar | 29/259 |
| 7,699,012 | B2 * | 4/2010 | Cotten | 114/197 |
| 8,214,988 | B2 * | 7/2012 | Lee et al. | 29/266 |
| 2009/0049592 | A1 * | 2/2009 | Kipp | 4/255.01 |

* cited by examiner

*Primary Examiner* — Minh Trinh

(74) *Attorney, Agent, or Firm* — Thomas W. Galvani, P.C.; Thomas W. Galvani

(57) ABSTRACT

A plug removal and/or installation system 400, which has a structural framework configured to support a removal assembly and that, allows approximately one axis motion of the removal device. The removal device is configured with a plug attachment device that is configured to pass through a lower framework structural opening. The structural framework is configured to movably self align so that the removal device exerts approximately a linear force on a plug 300 along an approximately single axis 335 parallel to a plug central axis.

4 Claims, 7 Drawing Sheets

SELF-ALIGNING PLUG REMOVAL AND INSTALLATION SYSTEM AND METHOD

This application claims priority to U.S. Provisional Application Ser. No. 61/283,285, filed Dec. 2, 2009, entitled "SELF ALIGNING PLUG REMOVAL AND INSTALLATION SYSTEM AND METHOD".

FIELD OF THE INVENTION

This invention is generally related to a closure and/or plug removal/installation system and method and in particular it is directed to a system and method for more efficient removal and/or installation of a plug for a jet boat without causing damage to the plug. As will be appreciated by those of skill in the art, the principles set forth will also have utility generally in the plug and/or closure removal and/or the installation arts.

BACKGROUND OF THE INVENTION

Jet boat owners and/or operators must occasionally remove a debris cleanout access plug to remove material clogging up the jet-pump intake and then reinstall the plug. The debris cleanout access plug is normally positioned directly over the jet-pump intake on a swim platform allowing easy access to the plug from the boat swim platform. The cleanout opening is convenient for owners/operators who use their boats in areas where there is sea-grass, floating debris and the like that can make its way into the jet pump inlet. The debris can actually cause the jet boat to become inoperable and therefore it needs to be removed to clear the jet pump inlet and make the boat operable again.

However, for example, when the boat is used in salt water, it is difficult to remove the debris cleanout access plug with known tools in the art (e.g., a hammer) due to corrosion, barnacle growth and the like. Such difficulty in removal often results in damage to the plug when large lateral loads are exerted on the plug. Plug removal is time consuming and very costly if the plug is damaged and has to be replaced.

In addition, pulling any tapered and/or conical sealing plug body (e.g., manhole cover), for example, out of an opening can be difficult and can result in injury to a person trying to separate the plug body from the opening (e.g., back injury, etc).

Thus, there exists a need for an improved system and method which simply and easily removes the cleanout access plug or any other conical/tapered plug without exerting large lateral loads on the plug, thus preventing damage.

SUMMARY OF THE INVENTION

The present invention overcomes the limitations of the prior art. Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

In accordance with one embodiment of the invention, a system and method is disclosed to simply and ease remove and/or install a debris cleanout access plug or any other conical/tapered plug without exerting large lateral loads on the plug and thus preventing damage to the plug.

In accordance with another embodiment of the present invention, a debris cleanout access plug removal system is disclosed which may be economically manufactured and sold on a widespread basis.

In accordance with yet another embodiment of the present invention, a debris cleanout access plug removal system is disclosed which may be attached to a debris cleanout access plug or any other conical/tapered plug without damaging the plug itself.

It is yet a further object of the invention to demonstrate a self aligning debris cleanout access plug removal system which applies a force approximately along a single axis of a plug center or any other conical/tapered plug so that the plug can be quickly removed without damaging the plug.

These and other objects and advantages of the present invention will be apparent to those of skill in the art from the description which follows.

DETAILED DESCRIPTION OF THE INVENTION

Figure 1:
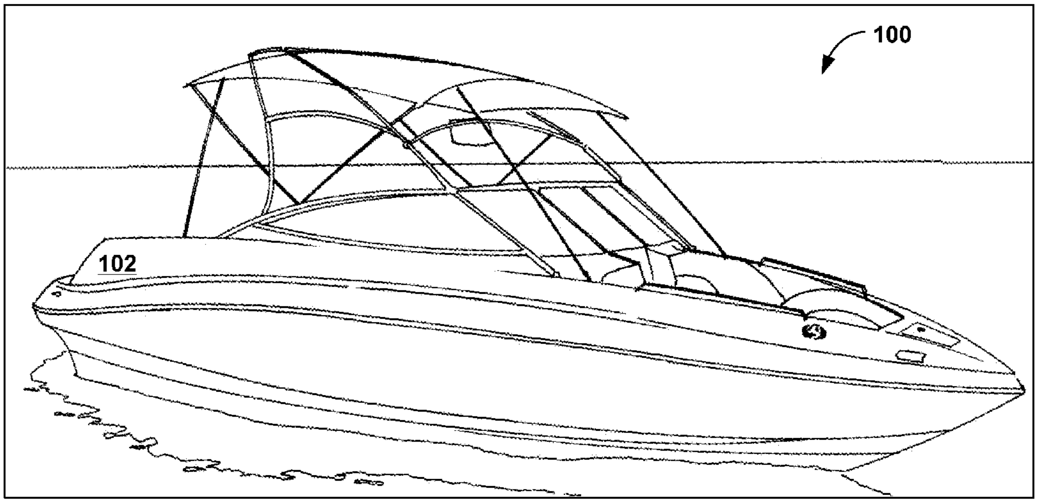
FIG. 1 is a side perspective view of a jet boat according to one exemplary embodiment of the present invention.

One or more implementations of the present invention will now be described with reference to the attached drawings, wherein like reference numerals are used to refer to like elements throughout. The invention relates to a plug removal and/or installation system and method wherein a debris cleanout access plug or conical and/or tapered plug is removed and/or installed by exerting a force along a plug single axis. The following description relates to a jet boat debris cleanout access plug, however, the system and method relates to any conical and/or tapered plug that is removed and/or installed by exerting a force along the plug single axis, thereby limiting the lateral loads on the plug.

Turning to FIG. 1, a perspective side view of a jet boat 100 is shown. Although the invention applies to a jet boat it also applies to vehicles further comprising jet skis, water jet related vehicles with a tapered plug, etc. A swim platform (not shown) is located at an aft end 102 of the jet boat 100. This invention will be described with respect to a plug removal system and method, wherein a cleanout access plug can be removed and/or installed safely, efficiently and without damage to the plug and/or plug receptacle. In addition, this system and method also applies to conical or tapered plugs comprising, for example, manhole covers, sealing plugs for cone-type tie rod openings in concrete walls, conical plugs in a preformed shape for sealing blast holes in open cut mining, cone shape flow meter plugs, globe valves with spherical or conical shaped plugs, spherical shaped plugs removal and installation, complex shaped tapered plugs removal and installation, and the like. In addition, the plug removal device can be built with any structure, known to those of skill in the art so that a plug mounted on a wall or a non-horizontal surface can be removed and/or installed, safely, efficiently and without damage to the plug and/or plug receptacle.

Figure 2:
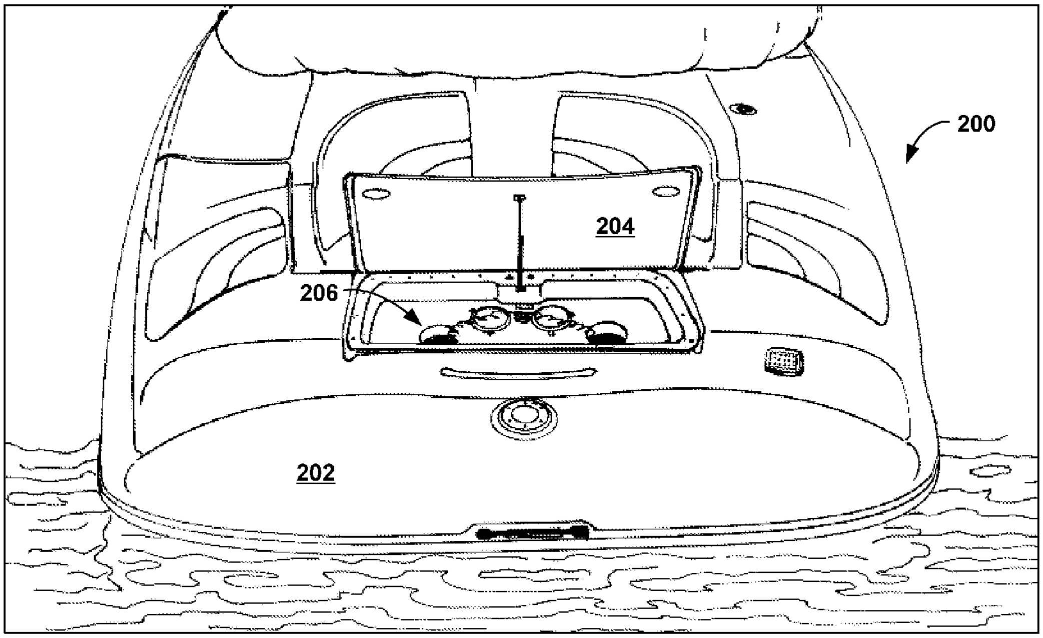
FIG. 2 is a rear perspective view of the aft end of the jet boat illustrating a cleanout port that provides access to a debris cleanout access plug according to another embodiment of the invention.

FIG. 2 is a drawing of an aft end 200 of the jet boat 100 from FIG. 1 illustrating a swim platform 202 and, an open hatch cover 204 that allows access to a cleanout port 206. A debris cleanout access plug (not shown) may be subjected to large forces/pressures during operation, and therefore it is held and/or locked tightly in an access plug receptacle (not shown). As discussed previously, the debris cleanout access plug provides a convenient means for owners/operators to remove grass and/or debris for example, that can make its way into the jet pump inlet and clog the intake. The debris can cause the jet boat 100 to shut down and rendered inoperable; therefore, the debris cleanout access plug needs to be removed to clear the jet pump inlet. It is often difficult to remove the debris cleanout access plug in saltwater conditions, for example, due to barnacle growth, corrosion, binding, salt build up and the like. As discussed supra, although this embodiment applies to the removal of the access plug, it can apply to removing any plug with a conical or tapered shape, comprising a manhole cover, a conical sealing plug body, a sealing plug for a cone-type tie rod opening in concrete walls, a conical plug in its pre-formed shape for sealing a blast hole in open cut mining, a cone shape flow meter plug, a globe valve with spherical or conical shaped plug, a spherical shaped plug, a complex shaped plug, various other shaped plugs, and the like.

Also, while the system and/or method in one embodiment illustrates plug removal it also applies to installing a plug, removing the plug and moving the plug out of the way during plug removal and/or plug installation procedures (e.g., removing and moving a manhole cover using a wheeled plug removal system), and other systems known by those of skill in the art. If the plug is not removed properly lateral loads on the plug can result in damage to the plug and/or plug receptacle resulting in costly replacement.

Figure 3:
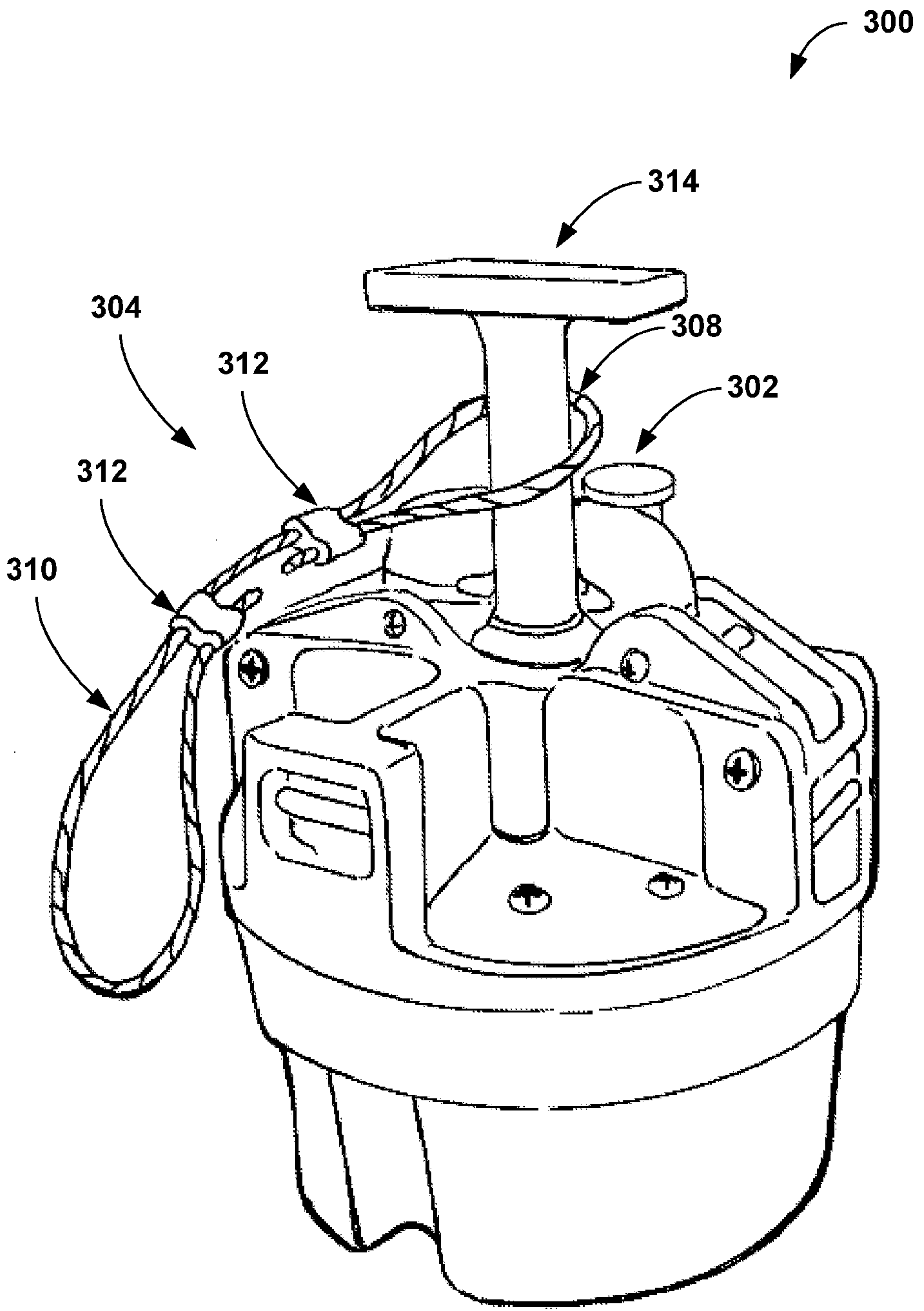
FIG. 3 is a perspective view of the debris cleanout access plug in accordance with yet another exemplary embodiment of the invention.

Illustrated in FIG. 3 is an illustration of a debris cleanout access plug 300 with a lanyard assembly 304 (as a component of an exemplary plug removal system and not the plug 300) that is configured with a first and a second lanyard loop 308 and 310, respectively. The first and the second lanyard loop 308 and 310 are formed using a plurality of clamping devices 312 that crimp separate wires of the first and second lanyard loops 308 and 310 together. The first lanyard loop 308 can be non-fixedly attached to an access plug t-handle 314, as shown so that an upward vertical force can be applied to the access plug 300 once the second lanyard loop 310 is attached to a plug removal system 400. In addition, the lanyard assembly 304 can be replaced by components comprising: multiple loops at the end of the lanyard assembly, hook and loop straps, carabineers, and the like and such components as are well known by those of skill in the art. An unlock button 302 is activated by pushing down on it to unlock the access plug 300 allowing the plug 300 to be removed. A jet boat operator and/or mechanic can reach into the cleanout port 206 (FIG. 2), for example to secure the first lanyard loop 308 around the t-handle 314. The inventor recognized that the jet boat operator and/or mechanic has to pull the plug 300 out along a plug single axis 335 and perpendicular to the top plane of the t-handle of the plug 300 (in this case the plug 300 is pulled along a vertical axis) to ensure that the lateral loads exerted on the plug 300 are minimized which prevents damage to the plug 300. It should be noted that in this preferred embodiment that the first lanyard loop 308 is slightly offset from the center of the t-handle 314 and offset from the plug single axis 335 and therefore small lateral loads will be applied to the plug 300. However, the lateral loads are small enough to easily remove the plug. Other systems, known by those of skill in the art can reduce and/or eliminate the small lateral loads present in the preferred embodiment.

Figure 4:
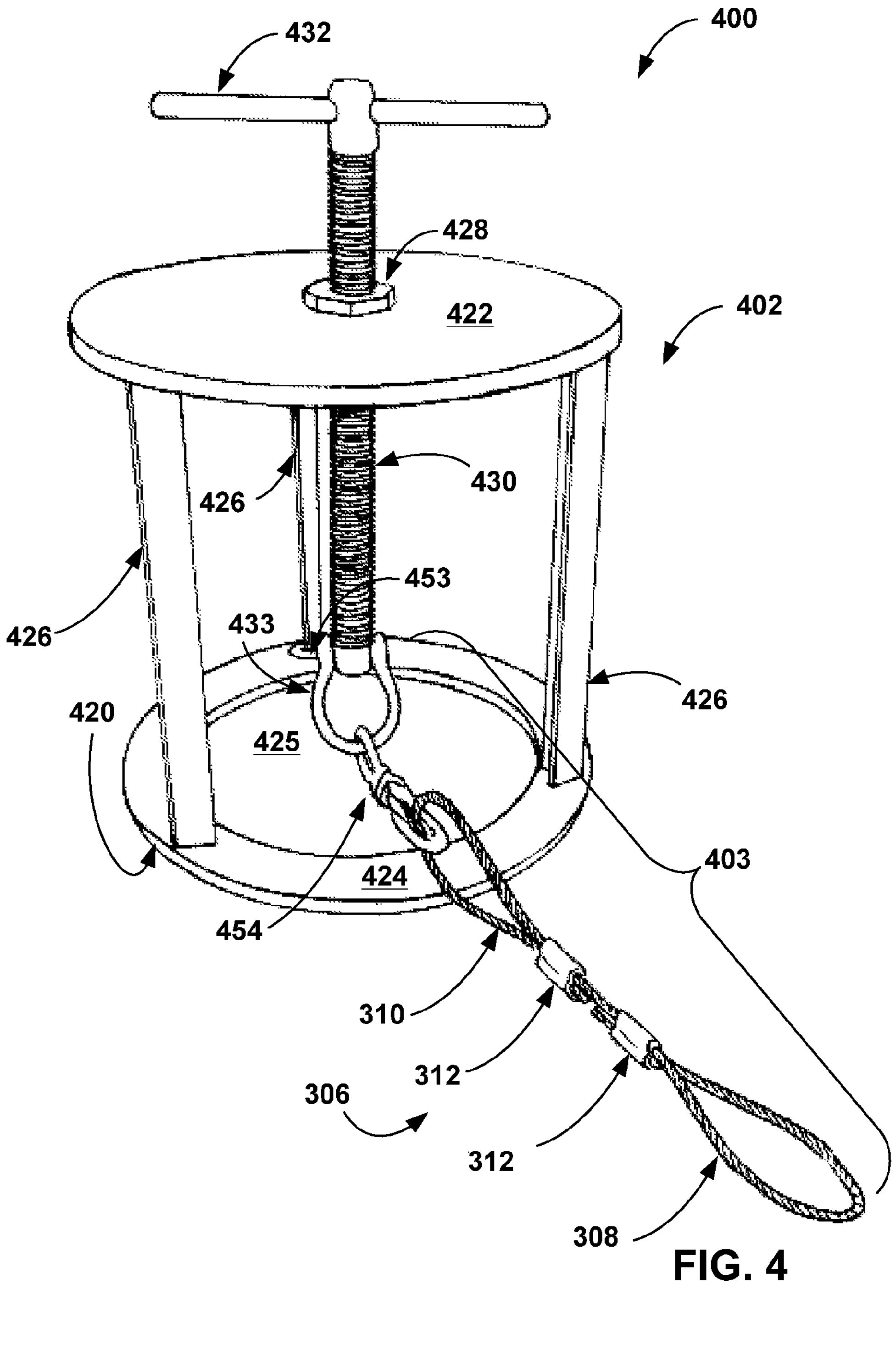
FIG. 4 is a perspective view of a plug removal system according to another embodiment of the invention.

FIG. 4 is a perspective top/side view of the plug removal system 400. The inventor further recognized that by creating the plug removal (and/or installation) system 400 with a structural framework 402 and a low friction base plate underside 420 that the system 400 would slide easily on a flat surface near the cleanout port 206 (FIG. 2).

In this embodiment the system 400 uses a circular opening 425 defined by the inner diameter of a bottom plate 424 which is of greater diameter than the plug 300 (FIG. 3) and the cleanout port 206 (FIG. 2). The low friction contact bottom plate underside 420, in this embodiment, spans the cleanout port 206 (FIG. 2) so that the system 400 will move laterally and self align with the plug 300 (FIG. 3) when a load is applied by the plug removal system 400 so that the lateral loads on the plug 300 are minimized when the plug 300 is removed. The underside 420 of the plug removal system 400 can be coated with a low friction material comprising fluoropolymers, PVC, high density polyvinyl chloride, carbon films, polytetrafluoroethylene, a combination of polymers, polymer coatings, wheels, bearings, casters, and the like, known by those of skill in the art. In this embodiment, the plug removal system 400 structural framework 402 comprises a top plate 422 with a center opening (not shown), the bottom plate 424 with the circular opening 425 separated by a plurality of structural support angle sections 426. The plug removal system 400 further comprises a hex nut 428 attached (e.g., welded) to the top plate 422 that is configured to non-fixedly attach a push/pull device 430 for use in applying a compressive and/or tensile load, for example. Threaded rods with throughhole t-handles are well known by those of skill in the art. In this embodiment, the push/pull device 430 is a threaded rod 403 with a non-fixedly attached t-handle 432, for example that is inserted in a hole in a top end 405 of the threaded rod 403.

Even though the plug removal 400 system is represented as shown, one skilled in the art could design numerous variations of a system that are both self-centering and that apply vertical and/or plug single axis force to a conical plug, and all such systems are contemplated herein.

In this embodiment, for example the top plate 422 can have an outside diameter of 8.75 inches and an inside diameter of 1.125 inches with a thickness of ⅛th of an inch. The bottom plate 424 can have, for example an outside diameter of 8.75 inches and an inside diameter opening of 6.75 inches. In this embodiment, the three-¾ inch×¾ inch by ⅛th inch structural support angle sections 426 with a length of 8 inches are used to fixedly attach the top plate 422 to the bottom plate 424. The threaded rod 403 in this embodiment is 1 inch in diameter with a length of 10 inches and two ½ inch holes drilled at each end of the rod 403 to facilitate the installation of the ½" round by 8 inches in length a t-handle rod 432 non-fixedly attached at the top of the push/pull device 430 and a ⅝ inch marine grade shackle 433 at the bottom of the second end 407 of a threaded rod 403 which using a bolt 453 (FIG. 4) that allows the push/pull device 430 to be attached to the shackle 433. The top plate 422 has a 1.125 inch center opening with a 1 inch threaded nut 428 fixedly attached over the 1.125 inch hole. The push/pull device 430 is non-fixedly attached through the 1 inch threaded nut 428 and the push/pull device 430 and/or lanyard assembly 306 can be extended down into the system lower plate circular opening 425. A rotating clasp hook 440 can be connected to the marine grade shackle 433. An approximately 10 inch long lanyard assembly 306 (FIG. 3) can be made of galvanized steel covered in plastic, for example. The rotating clasp hook 454 can be attached to the marine grade shackle 433 at a second end 407 of the threaded rod 403.

Note that although the exemplary plug removal system 400 described supra is shown as a rigid structure it is well know by those of skill in the art to make an alternate plug removal system that is easily disassembled for storage, flexible, involve a floatation device. In addition the system 400 can have hinged joints, telescoping supports, and the like, and all such plug removal and installation systems are envisioned in this invention.

Figure 5:
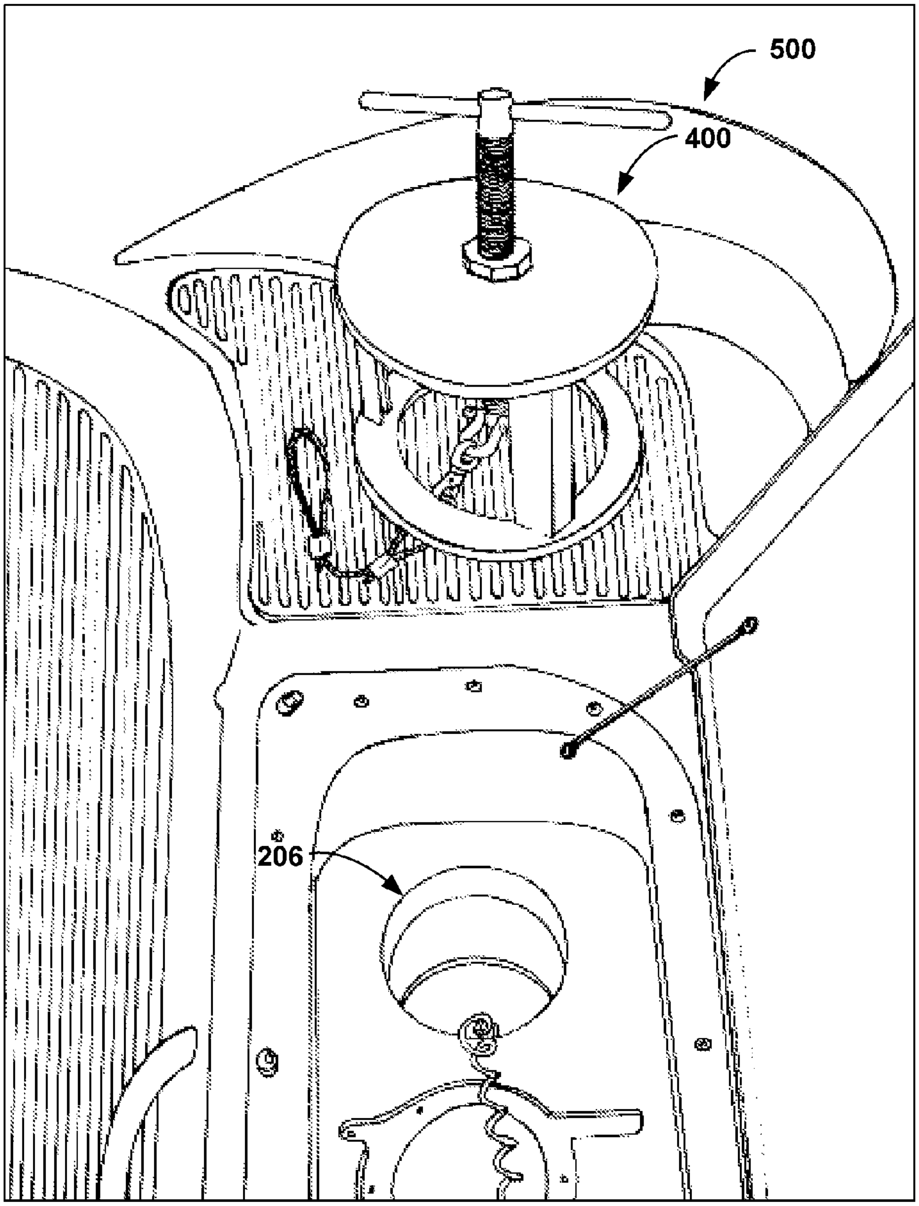
FIG. 5 is a perspective view of a plug removal system resting on an aft end of a jet boat adjacent to a cleanout port according to another embodiment of the present invention.
Figure 6:
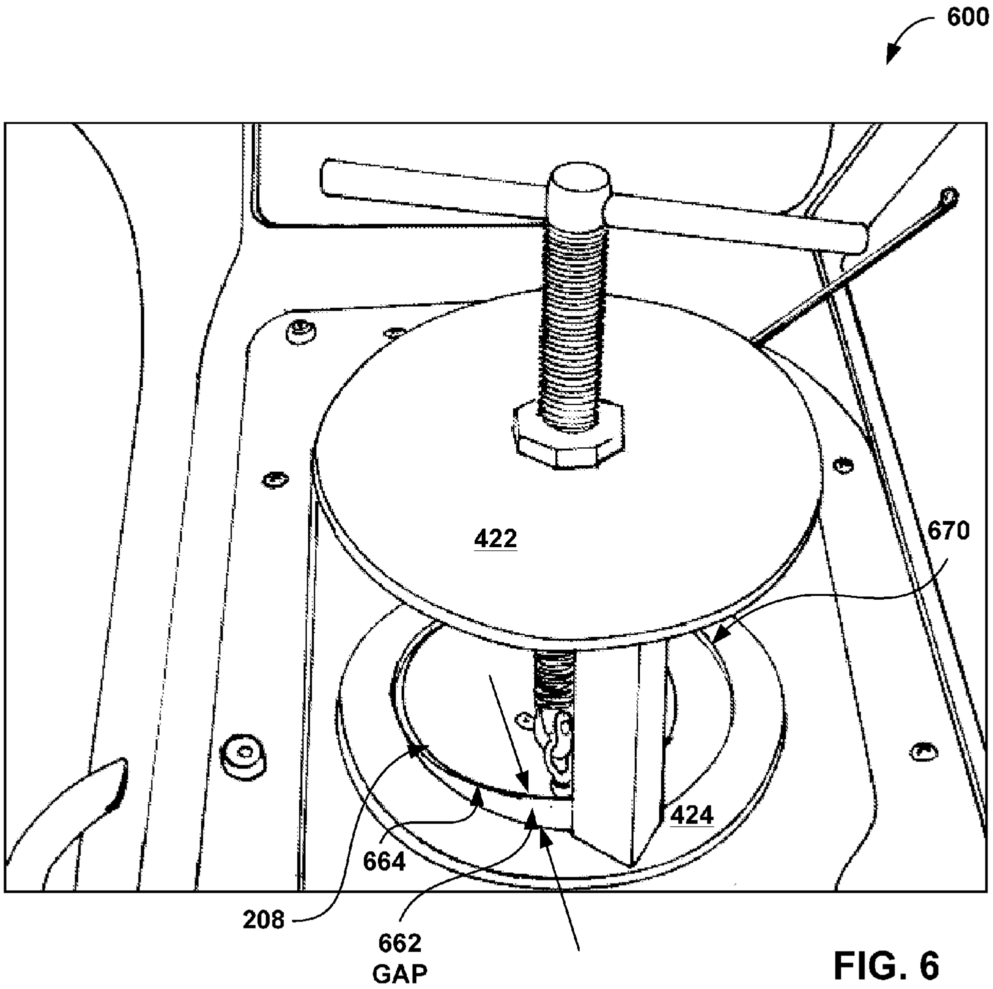
FIG. 6 is a perspective view of a plug removal system placed over and misaligned with a cleanout port according to another exemplary embodiment of the invention.

FIG. 5 illustrates the plug removal system 400 resting on the swim platform area near the cleanout port 206. Illustrated in FIG. 6 the exemplary plug removal system 400 is placed over the cleanout port 206 (FIG. 5). As can be seen in FIG. 6 the center opening of the bottom plate 424 of the plug removal system 400 is misaligned with the center of the cleanout port 206. (FIG. 2) with a first given gap 662 measured from the bottom plate inner ring 670 to the cleanout port outer edge 664. The bottom plate 424 in this embodiment is made of steel with a flat undersurface surface having a low coefficient of friction. The undersurface materials may comprise plastics, polymers, ball bearings, and the like known by those of skill in the art. This allows the center of the bottom plate circular opening 425 to align with the cleanout port 208 (FIG. 2) center opening when tension is applied to the cleanout plug 300.

Even though a system s is shown with the push/pull device 430 in a vertical direction it is apparent to one skilled in the art that systems and methods to hold a plug for removal and installation using a tool at any angle with a support structure that can for example pull a plug out of a wall, an angular wall for example and the lanyard assembly is not necessary wherein the treaded rod can be screwed into a threaded plug so that when the threaded plug is removed from the push/pull device 430, the threaded plug is held approximately rigid on the push/pull device 430, for example.

Figure 7:
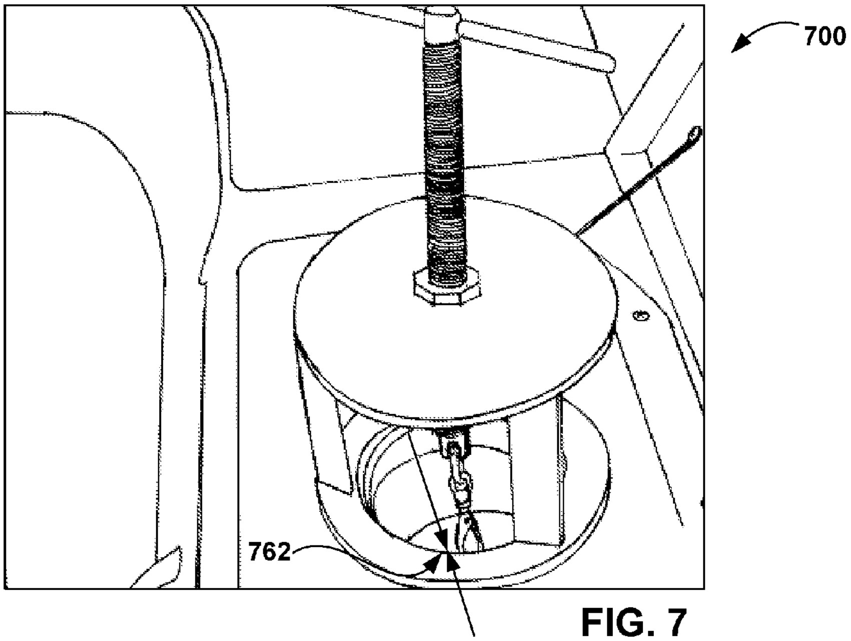
FIG. 7 is a perspective view of a plug removal system after self alignment to center the system over a cleanout port, after an upward force is applied to a debris cleanout access plug.
Figure 8:
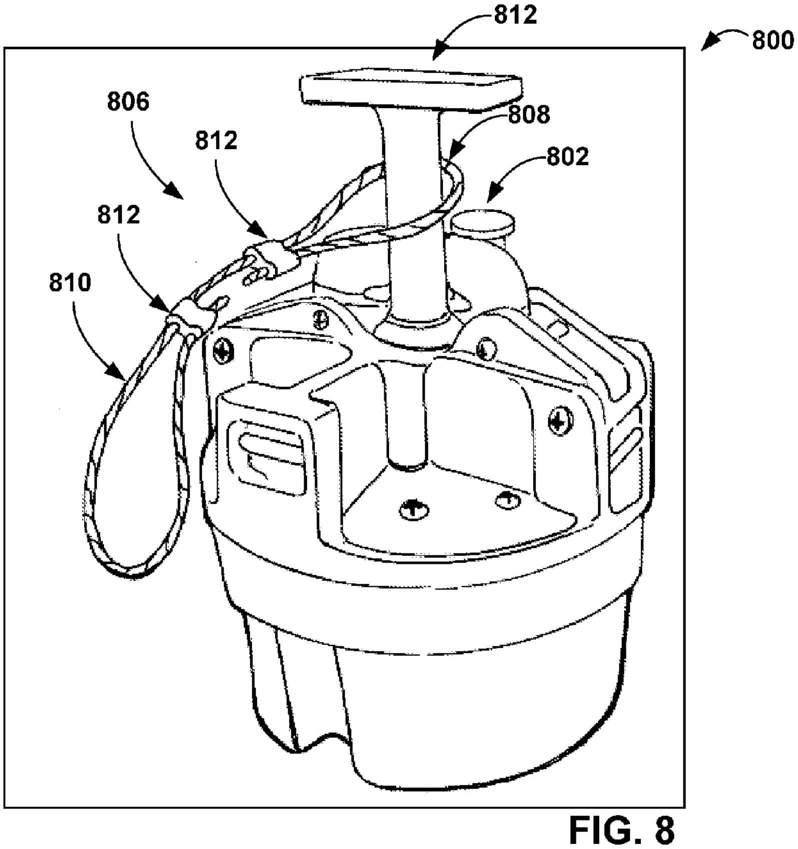
FIG. 8 is a perspective view of a debris cleanout access plug removed with a first lanyard loop attached to a t-handle of a debris cleanout access plug according to an embodiment of the invention.

FIG. 7 shows the plug removal system 400 (FIG. 4) as the push/pull device 430 is turned counterclockwise to apply an upward force to the cleanout access plug 300. As the force is applied, the system 600 "self-aligns" to reduce the gap distance to a gap 762 until the system 600 is centered over the plug 300. The self-aligning of the system 600 reduces and/or eliminates lateral forces applied on the cleanout access plug 300. The drawing shown in FIG. 8 shows a plug 300 removed from the cleanout port 206. Although not shown, the plug 300 can be reinstalled using a system (not shown) that has for example, three clamps attached to a system base, a system that utilizes one or more and in this embodiment C-clamps and the like. For example, a bottom plate opening (not shown) can be centered over a port opening and the C-clamps can be attached approximately equidistant around the perimeter of the port opening. One end of the C-clamp can be placed inside the port near the edge and the other end of the C-clamp can be placed on a top surface of the bottom plate 424. Once all of the C-clamps are secured a push/pull device 430 can be turned clockwise, for example to apply a downward force to the plug 300 to reinstall the plug 300.

In addition, although the embodiments are shown with a push/pull device 430 the present invention could make use of any device that applies a linear force (manual/electrical and the like): comprising an electrical motor, a linear actuator, a gear train assembly, a rack and pinion, a lever and fulcrum and the like, known by those of skill in the art.

Figure 9:
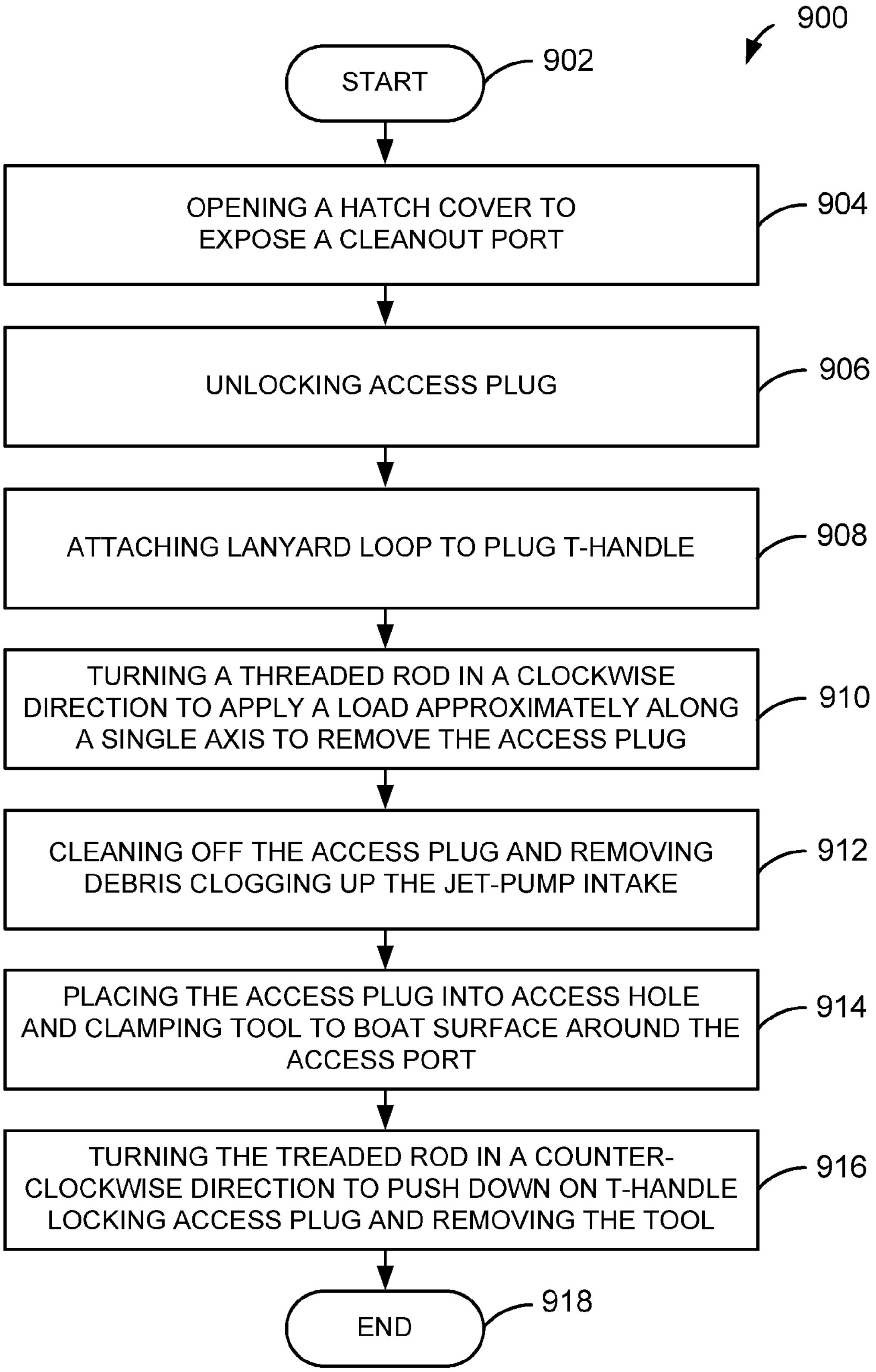
FIG. 9 is a block diagram of a method of removing and reinstalling a debris cleanout access plug according to another embodiment of the invention.

According to yet another exemplary aspect of the present invention, FIG. 9 is a schematic block diagram of a method 900 illustrating a method of removing and/or installing an access plug 300 according to the exemplary self-aligning plug removal method 900. The method 900 will be described with reference to FIGS. 1-8. While the exemplary method 900 is illustrated and described herein as a series of acts or events, it will be appreciated that the present invention is not limited by the illustrated ordering of such acts or events, as some acts or events may occur in different orders and/or concurrently with other steps apart from that shown and described herein, in accordance with the invention. In addition, not all illustrated acts may be required to implement a methodology in accordance with the present invention. Moreover, it will be appreciated that the method 900 may be implemented in association with the systems illustrated and described herein as well as in association with other systems, not illustrated.

As illustrated in FIG. 9, the method 900 begins at 902. At 904 an owner/operator/mechanic can expose the cleanout port 206 (FIG. 2) by opening the hatch cover 204 (FIG. 2) that stays open utilizing a hatch cover latching device. The cleanout port 206 allows access to the debris cleanout access plug 300 (FIG. 3) and is normally positioned directly over the jet-pump intake on a swim platform allowing easy access to the plug 300 on a jet boat 100. The cleanout port 206 is convenient for owners/operators who use their boats in areas where there is sea-grass, floating debris and the like that can make its way into the jet pump inlet. The debris can cause the jet boat 100 to become inoperable, and therefore, the plug 300 often needs to be removed to clear the jet pump inlet.

At 906 the access plug 300 can be unlocked by pushing on the unlock button 302. At 908 the first lanyard loop 308 can be attached to the access plug t-handle 314. The lanyard assembly 306 can be attached to the push/pull device 430 (FIG. 4) of the plug removal system 400 utilizing a rotating clasp hook 454 attached to the marine grade shackle 433. At 910 the access plug 300 can be removed by turning the push/pull device 430 in a counterclockwise direction to apply a load along a plug single axis to remove the access plug 300. As the loading on the access plug 300 increases the system 400 will self-align as described supra so that a lanyard assembly 306 applies plug single axis force to the plug 300.

At 912 the access plug 300 can be cleaned off, for example removing barnacles, salt deposits and debris clogging up the jet-pump intake can be taken out and discarded. At 914 the plug 300 can be re-installed by placing the access plug 300 into the access hole 206 and clamping (clamps not shown) the system 400 to the boat surface around an access port 206. At 916 the push/pull device 430 can be turned in a clockwise direction to push down on the handle 314 locking the access plug 300 and removing the system 400, wherein the method 900 ends at 314.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, systems, etc.), the terms (including a reference to a “means”) used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms “including”, “includes”, “having”, “has”, “with”, or variants thereof are used in either the detailed description and the claims, such terms are intended to be inclusive in a manner similar to the term “comprising”.

What is claimed is:

1. A plug removal system, comprising:

a movable structural framework member configured to support and non-fixedly attach to a pull device to apply a force in a plug single axis to a non-threaded, tapered plug so that the plug moves along the plug single axis;

the structural framework member is configured to movably self align so that the framework member exerts a linear force on the plug along the plug single axis;

a force application assembly including a push/pull device and/or a flexible assembly;

the push/pull device comprises a threaded rod configured with a non-fixedly attached t-handle; and the flexible assembly includes a shackle that is non-fixedly attached to the push/pull device with a bolt passing through a hole in the second end of the threaded rod, a clasp hook configured to rotate that is non-fixedly attached to the shackle, and a lanyard loop assembly that is non-fixedly attached to the rotating clasp hook.

2. The plug removal system of claim 1, wherein the structural framework member further comprises:

a top plate;

a bottom plate with a circular opening;

a bottom plate lower surface is low friction material; and an intermediate support structure configured to fixedly attach the top plate to the bottom plate.

3. The plug removal system of claim 2, wherein:

the structural framework is made from materials comprising metal, steel, stainless steel, composites, plastics, aluminum, PVC, wood or any combination thereof; and the bottom plate lower surface is made from materials composites, plastic and PVC.

4. The plug removal system of claim 1, wherein the plug can further comprise manhole covers, sealing plugs for cone-type tie rod openings in concrete walls, conical plug in a preformed-formed shape for sealing blast holes open cut mining, cone shape flow meter plugs, or conical shaped plugs.

* * * * *